United States Patent

[11] 3,614,032

| [72] | Inventor | Thomas H. Purcell, Jr.<br>2709 Everett Ave., Raleigh, N.C. 27607 |
|---|---|---|
| [21] | Appl. No. | 819,749 |
| [22] | Filed | Apr. 28, 1969 |
| [45] | Patented | Oct. 19, 1971 |

[54] AIRCRAFT
10 Claims, 28 Drawing Figs.

[52] U.S. Cl. ............................................. 244/36,
114/123, 9/6
[51] Int. Cl. ............................................. B64c 1/00
[50] Field of Search ............................................. 244/36,
101, 105, 106, 16, 11, 22, 117, 119, 90, 42, 42.6,
42.63, 49, 108; 114/123

[56] References Cited
UNITED STATES PATENTS

| 1,192,248 | 7/1916 | Wanne | 244/87 |
|---|---|---|---|
| 1,727,047 | 9/1929 | Burchell | 244/87 X |
| 1,874,469 | 8/1932 | Douglas | 244/36 |
| 1,998,487 | 4/1935 | Burnelli | 244/36 |
| 2,141,534 | 12/1938 | Hudson | 244/49 |
| 2,174,542 | 10/1939 | Weick | 244/90 |
| 2,288,829 | 7/1942 | Newman | 244/117 X |
| 2,347,841 | 5/1944 | Parker | 244/106 |
| 2,354,569 | 7/1944 | Beard | 244/106 X |
| 2,402,118 | 6/1946 | Ashkenas | 244/90 |
| 2,402,468 | 6/1946 | Thompson | 244/49 |
| 2,720,367 | 10/1955 | Doolittle | 244/1 |
| 2,842,325 | 7/1958 | Green et al. | 244/108 X |
| 3,128,065 | 4/1964 | Landes | 244/108 |
| 3,249,327 | 5/1966 | Smith, Jr. | 244/36 X |

*Primary Examiner*—Milton Buchler
*Assistant Examiner*—Carl A. Rutledge
*Attorney*—John G. Mills, III

ABSTRACT: In abstract, a preferred embodiment of this invention is an aircraft design capable of being built by amateurs in stages as time and money become available while at the same time being readily adaptable for assembly line production. This aircraft uses a new concept of designing the upper portion of the fuselage to conform to the shape of the plane formed at the junction of two intersecting cylinders disposed angularly to each other. This fuselage shape in combination with a minimum flotation system gives an extremely stable aircraft on both water, land and in the air which has a tremendous load carrying capacity for the size power plant required.

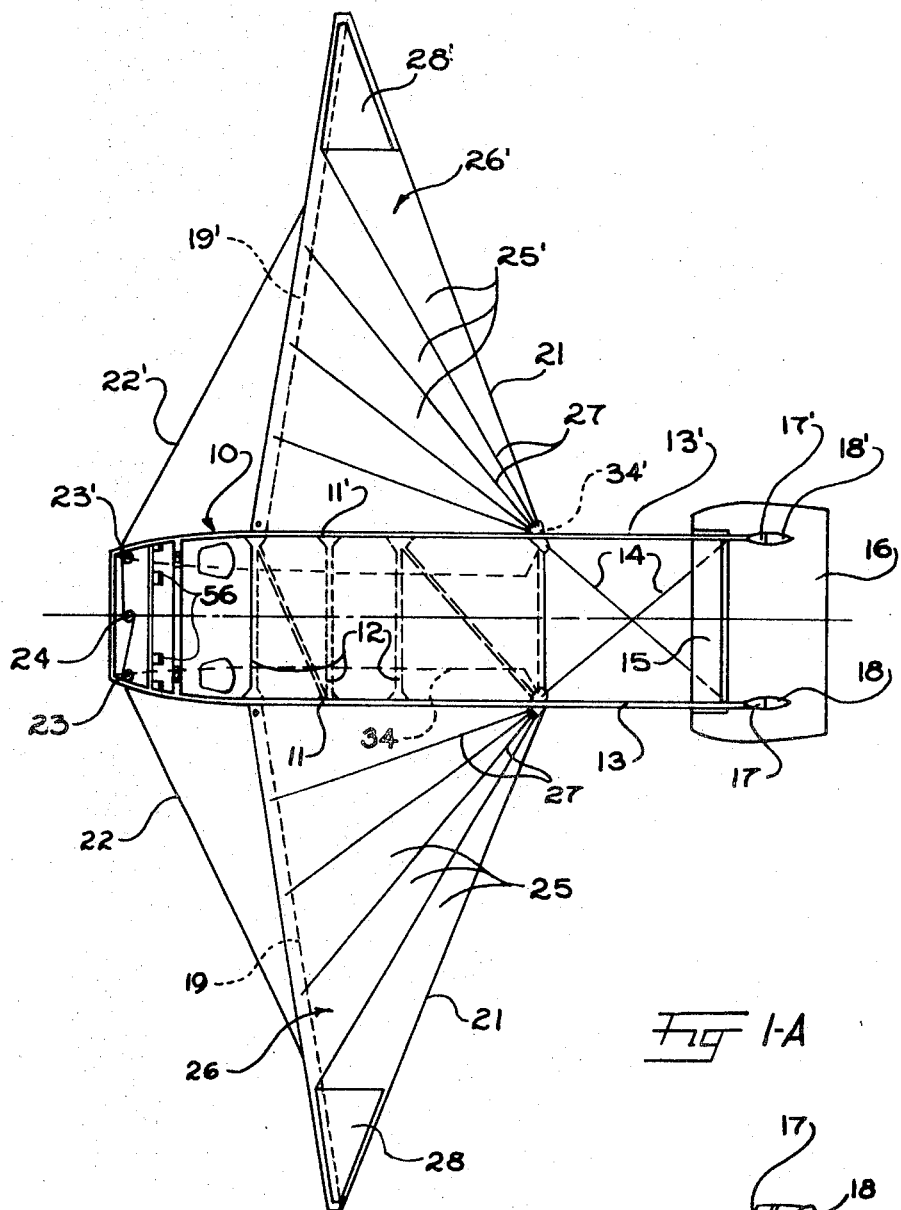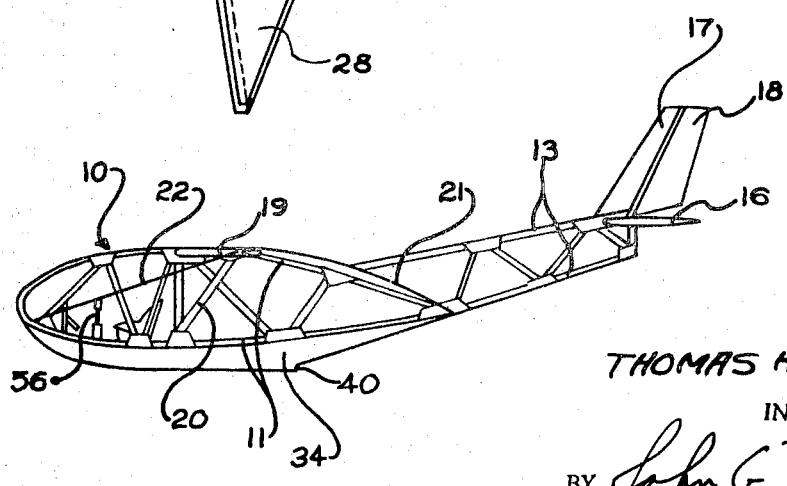

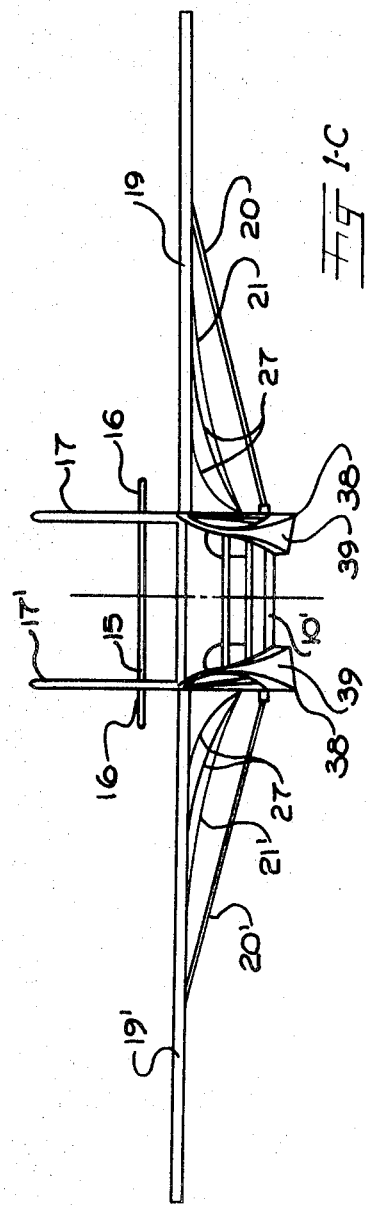
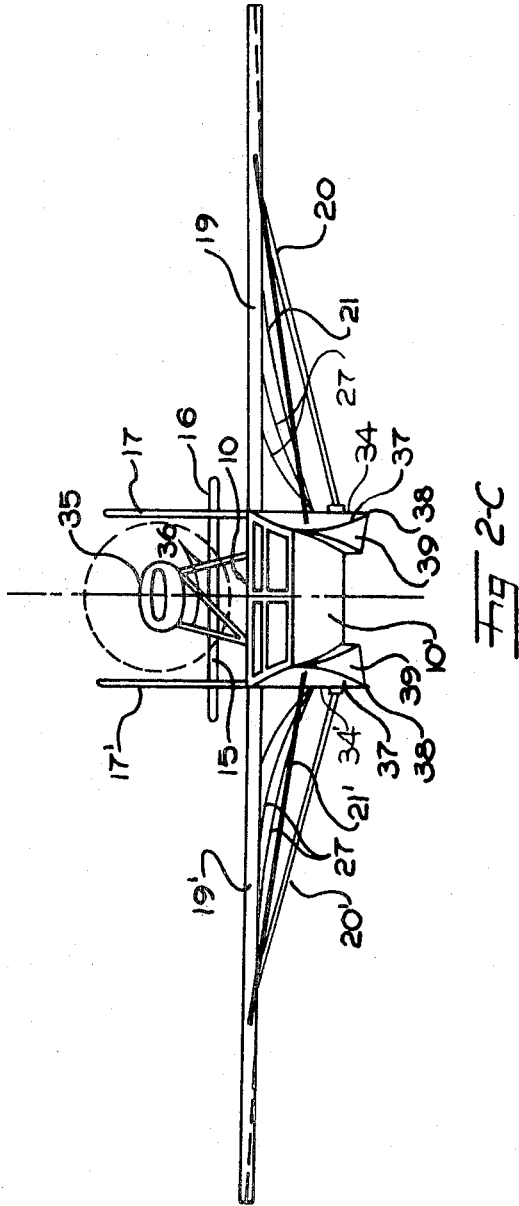

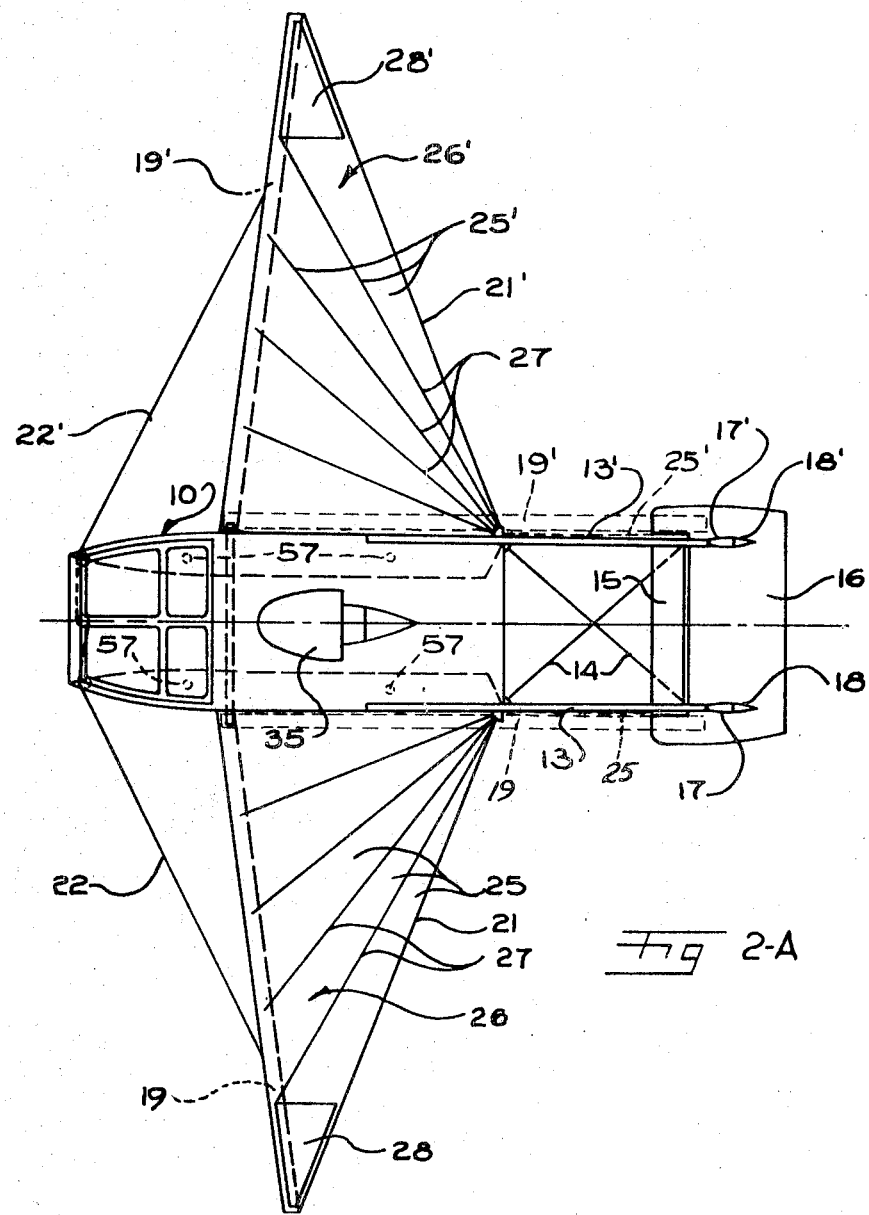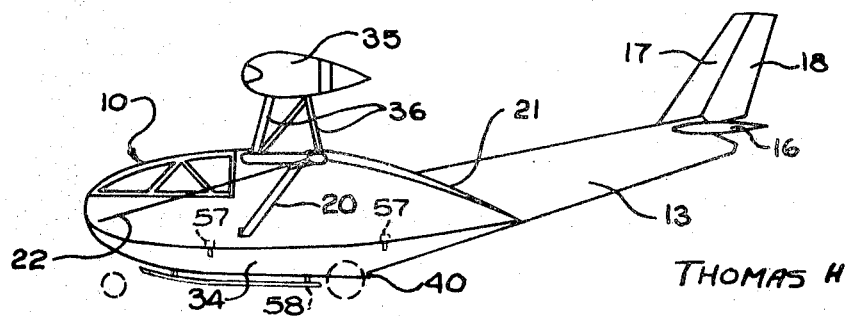

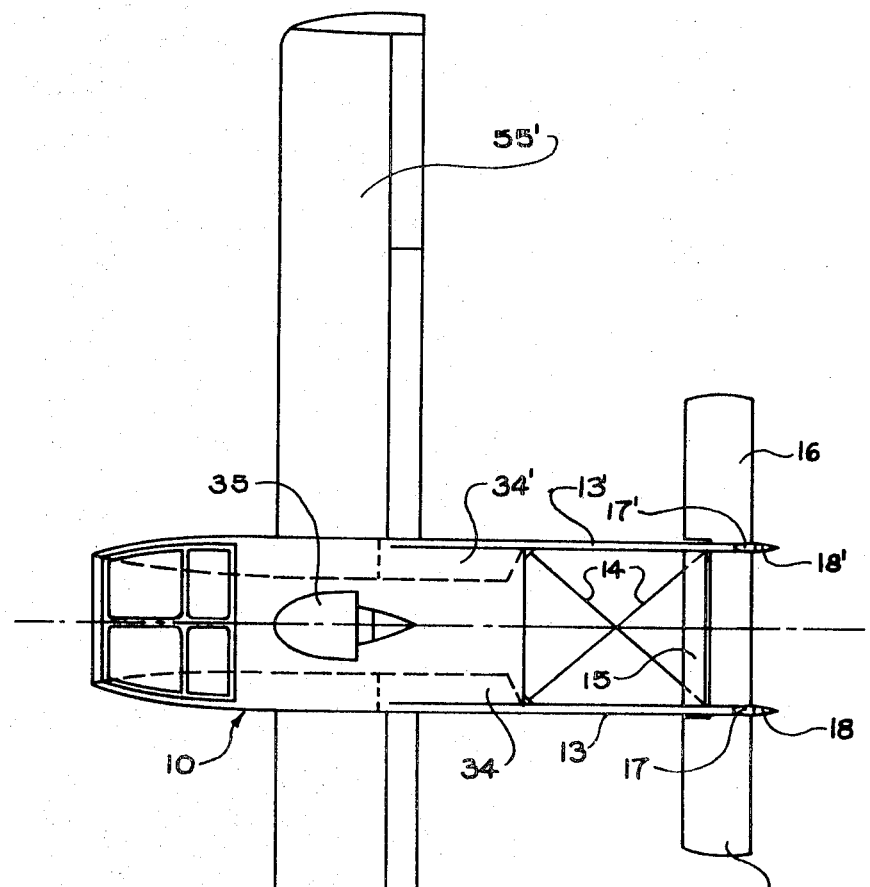
Fig 3-A
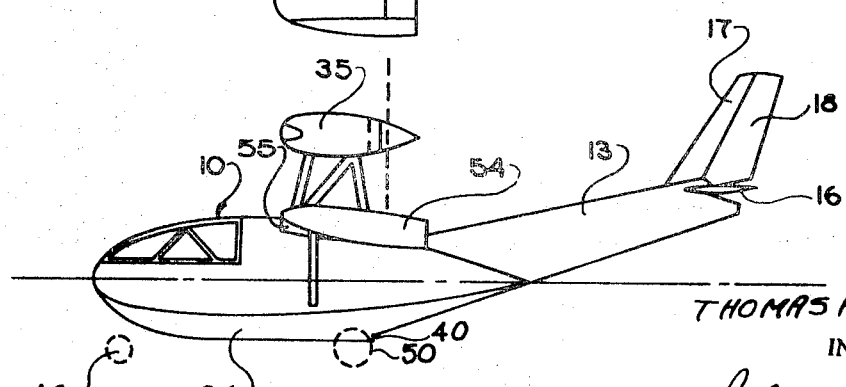
Fig 3-B
THOMAS H. PURCELL
INVENTOR.
BY John G. Mills
ATTORNEY

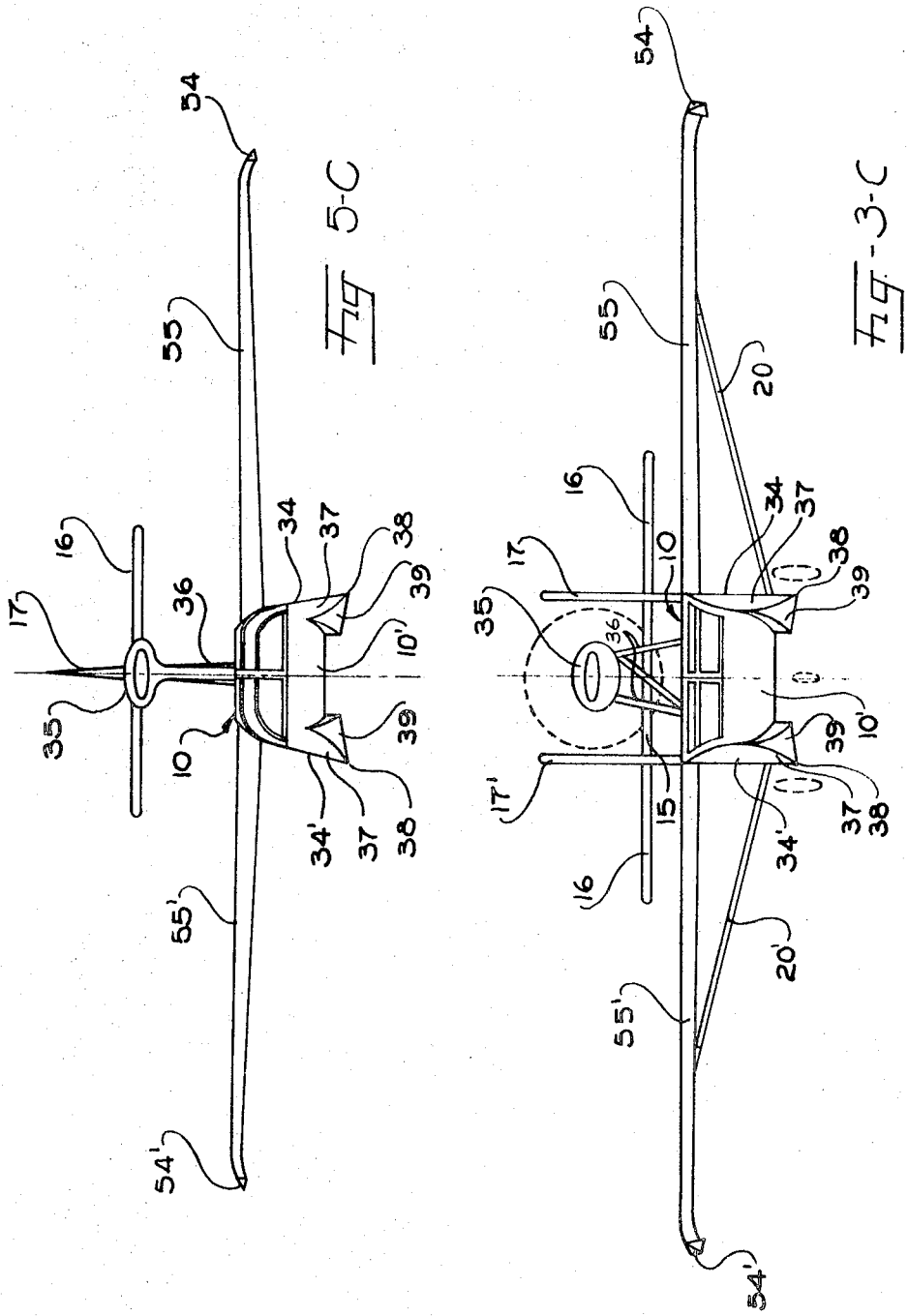

PATENTED OCT 19 1971  3,614,032
SHEET 06 OF 12
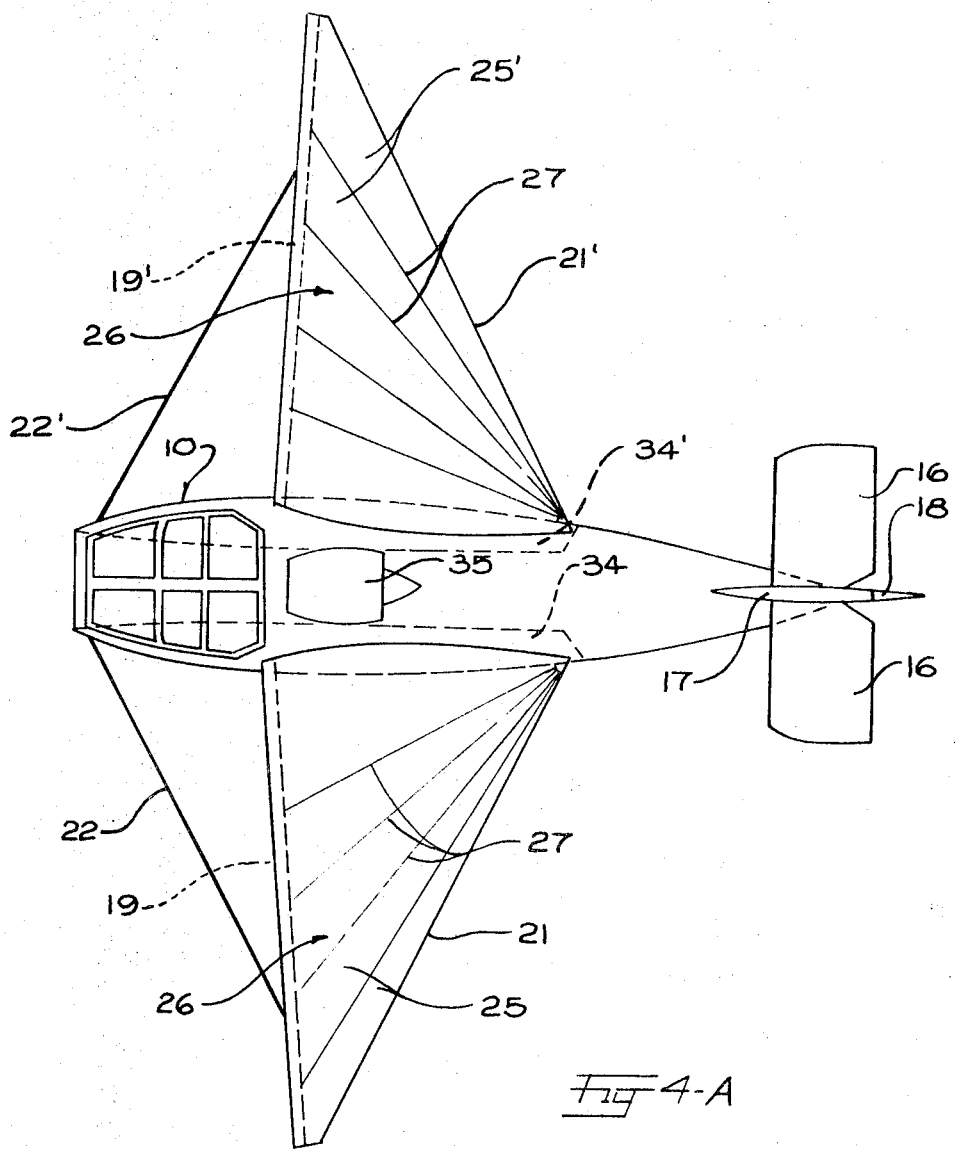
Fig 4-A
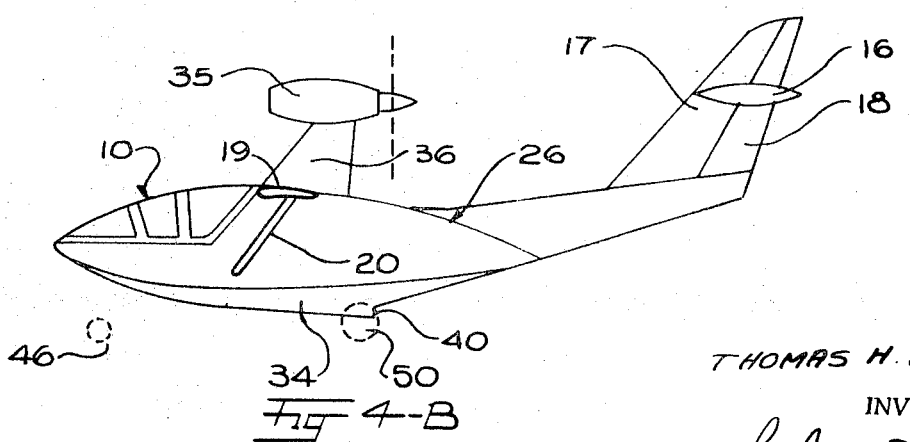
Fig 4-B
THOMAS H. PURCELL
INVENTOR.
BY John G. Mills
ATTORNEY

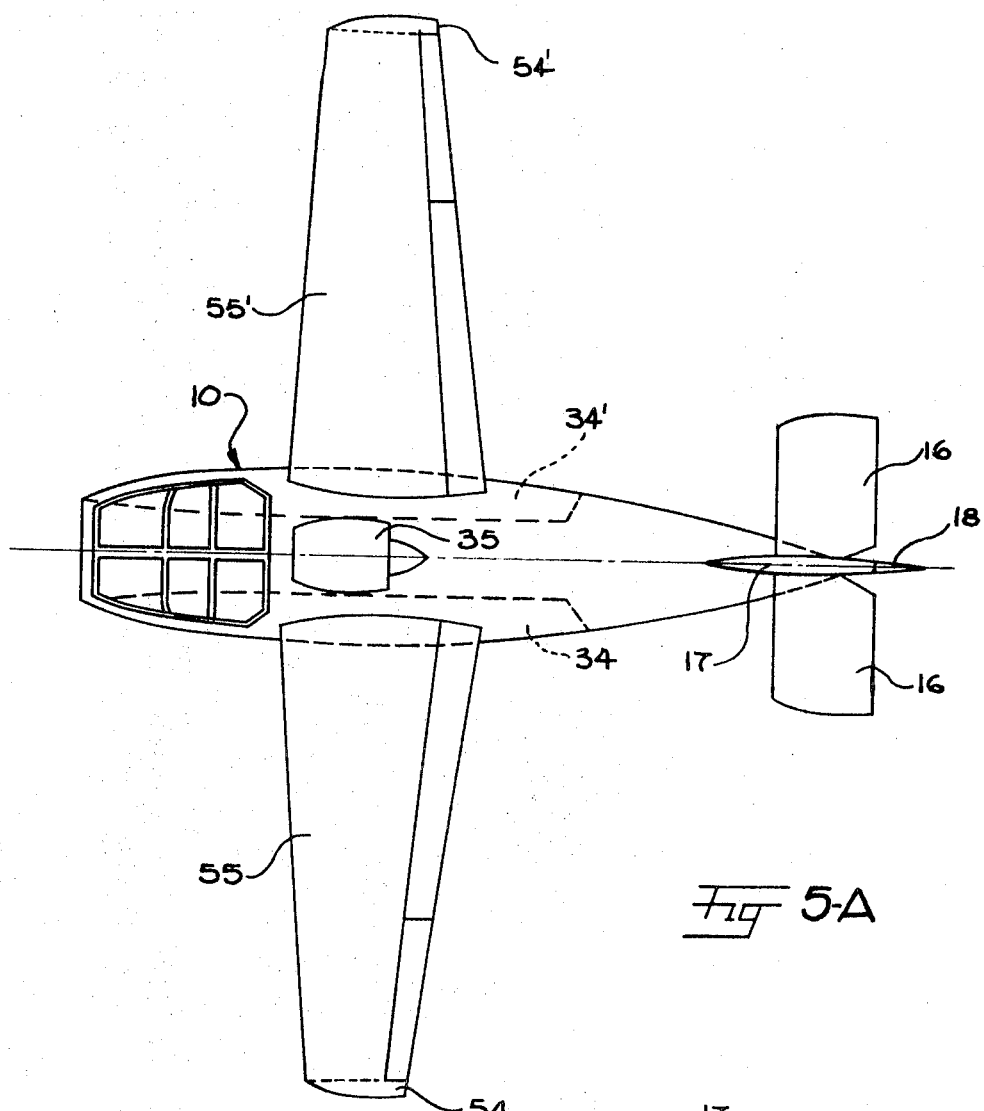
FIG 5-A
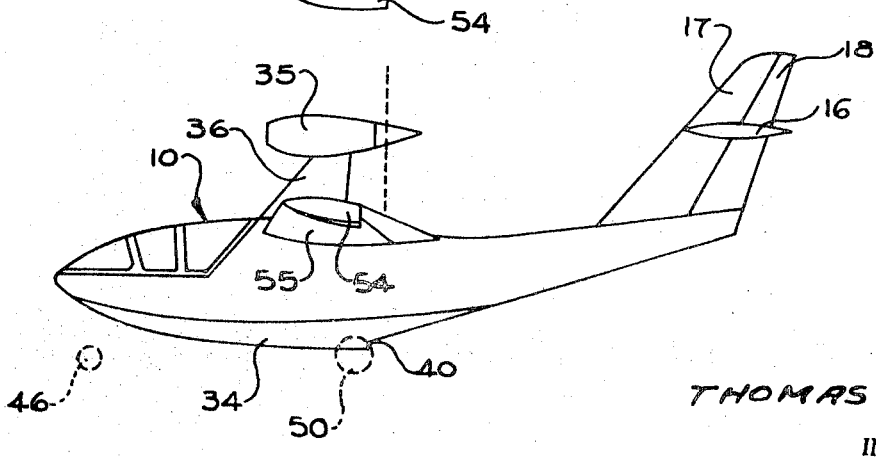
FIG 5-B
THOMAS H. PURCELL
INVENTOR.
BY John G. Mills III
ATTORNEY

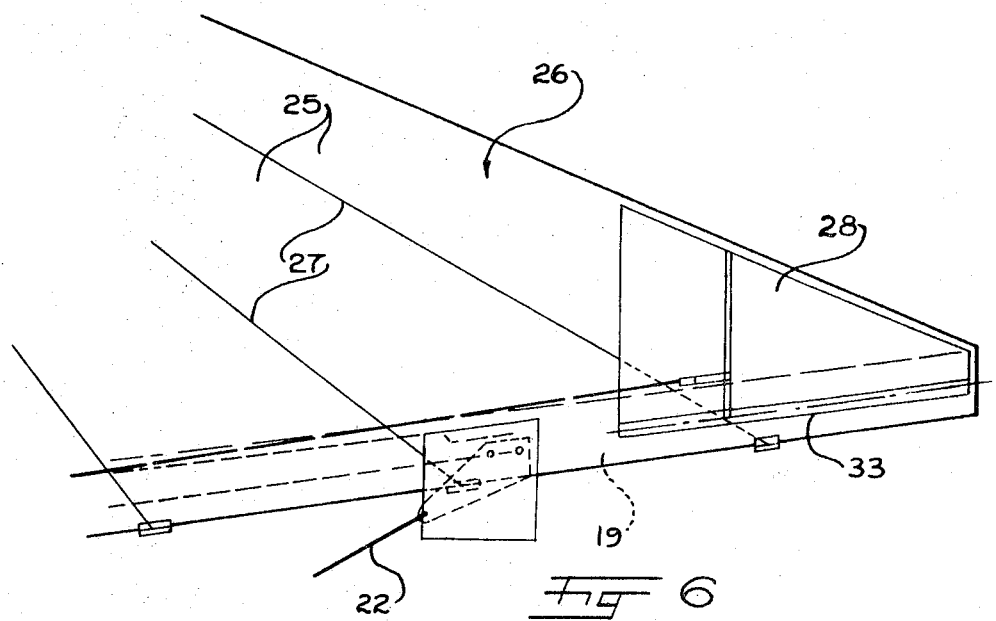
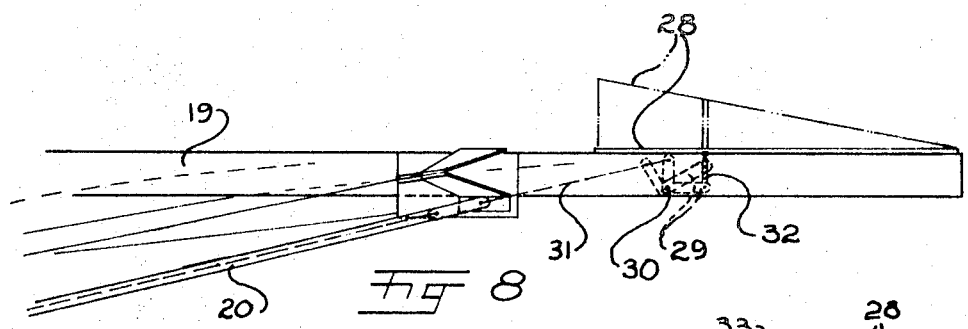
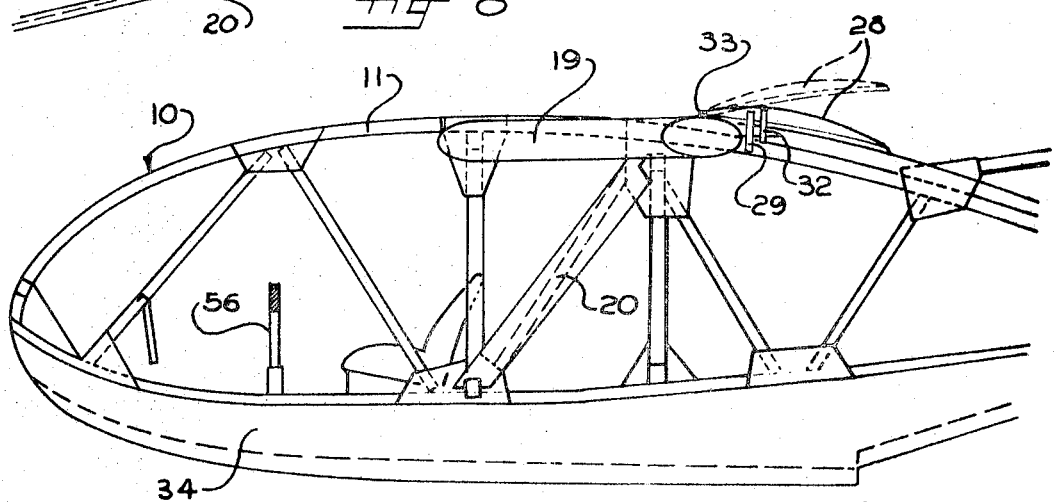

THOMAS H. PURCELL
INVENTOR.

BY John G. Mills
ATTORNEY

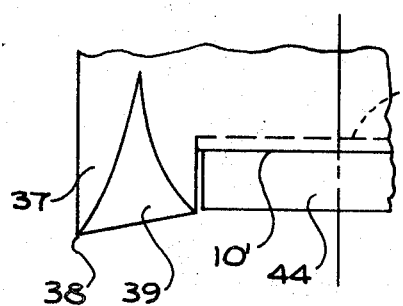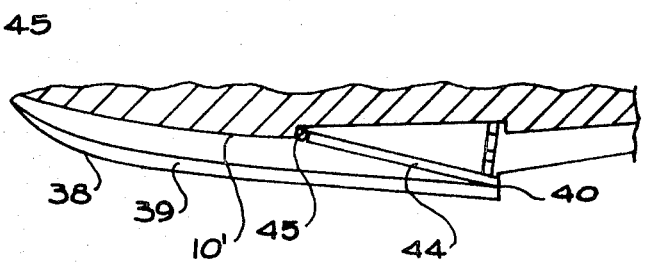
Fig. 14     Fig. 15
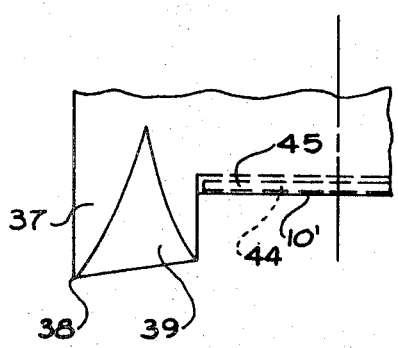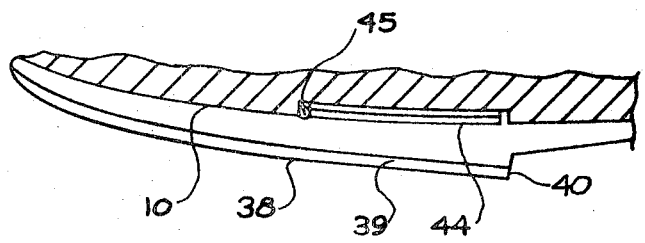
Fig. 16     Fig. 17
THOMAS H. PURCELL
INVENTOR.
BY John G. Mills
ATTORNEY

THOMAS H. PURCELL
INVENTOR.

BY John G. Mills
ATTORNEY

AIRCRAFT

This invention relates to flying devices and more particularly to an improved fuselage design in combination with various wing configurations and floatation means.

In the past, various attempts have been made to design the fuselages of heavier-than-air craft to generally conform to the shape of airfoil lift surfaces. These designs have, however, generally been derived at by dissecting an airfoil having the lift capacity desired and using this section as the camber of the fuselage. The results of this type of fuselage configuration have been of questionable benefit at best primarily because the method of arriving at the proper camber has not been correct.

In recent years, a considerable amount of experimentation has been accomplished in the concept of flexible wing aircraft and their obvious advantages over rigid winged aircraft. Stability has been one of the problems that has plagued so called flex-wing aircraft as has been the problem of producing an inexpensive, structurally sound unit having more or less conventional aircraft performance, interior configuration and load capacities.

The present invention has been developed after much research, experimentation and study into the above-mentioned problems and is designed to give an inexpensively constructed aircraft with superior lift capacities in combination with extremely stable characteristics both while operating on land, water and in the air. With slight modifications in the basic hull design, the present invention can be fitted with a flexible-type wing, a rigid wing or a foldable rigid wing. Aerodynamic streamlining of the floats is also accomplished along with the provision of retractable planing means to give additional operational advantages.

It is an object, therefore, of the present invention to provide a generally airfoil shaped fuselage of simple enough construction for amateurs to build and fly that is structurally sound and aerodynamically and water dynamically superior to more complex flying crafts.

Another object of the present invention is to provide an airfoil shaped fuselage which can be constructed in stages from a flyable open frame glider to an enclosed powered aircraft.

A further object of the present invention is to provide an aircraft having a fuselage with the upper portion curved according to the plane of intersection between two angularly disposed, generally circular or elliptically shaped cylinders.

An additional object of the present invention is to provide for an aircraft, a float means having a negative dihedral to improve the stability thereof.

Another object of the present invention is to provide an aircraft-type fuselage with a minimum sized removable float means attached thereto.

Another object of the present invention is to provide an aircraft with floats that are removable and attachable without interfering with the mounting and operation of wheel type landing gear.

Another object of the present invention is to provide a hull having a retractable planing flap or surface disposed between at least two float means whereby a planing condition may more rapidly be accomplished upon forward acceleration.

Another object of the present invention is to provide a step-type float having retractable contour fairings operatively mounted thereon to aerodynamically streamline such float when the step is not needed.

An additional object of the present invention is to provide a flexible wing aircraft having a leading edge spar giving support thereto.

Another object of the present invention is to provide a heavier-than-air craft having both rigid and flexible-type airfoils compatibly integrated to give greater lift characteristics.

Another object of the present invention is to provide a flex-wing type aircraft having the interior edge of each wing contoured to the upper surface of the fuselage.

Another object of the present invetion is to provide in a flexible wing aircraft having a forwardly disposed stay giving tensioned support to the main spar of the wing.

Another object of the present invention is to provide a flexible wing aircraft having overlay ailerons capable of pivoting from a generally horizontal position upwardly.

Another object of the present invention is to provide a flex-wing aircraft having a pair of overlay type ailerons mounted on the tips thereof to make them independent of the stall condition of the wing.

Another object of the present invetnion is to provide an aircraft-type fuselage having contour adaptable to conformitively mount either flexible or rigid-type wings.

Another object of the present invention is to provide a basic aircraft hull configuration as readily adaptable to receive a foldable flexible-type wing as to receive a foldable rigid-type wing.

Other objects and advantages of the present invention will become apparent and obvious from a study of the following description and the accompanying drawings which are merly illustrative of the present invention.

In the drawings:

FIG. 1–A is a top plan view of the basic flex-wing configuration of the present invention;

FIG. 1–B is a side elevational view of such configuration;

FIG. 1–C is a front elevational view of the same;

FIG.2–A is a top plan view of an enclosed, powered flew-wing version of the present invention;

FIG. 2–B is a side elevational view of such configuration;

FIG. 3–C is a front elevational view of the same;

FIG. 3–A is a top plan view of a rigid-wing configuration of the present invention;

FIG. 3–B is a side elevational view of such configuration;

FIG. 3–C is a front elevational view of the same;

FIG. 4–A is a more sophisticated, streamlined version of the flex-wing concept;

FIG. 4–B is a side elevational view of the same;

FIG. 5–A is a top plan view of a streamlined rigid-wing modification of the present invention;

FIG. 5–B is a side elevational view of such modification;

FIG. 5–C is a front elevational view of the same;

FIG. 6 is a top plan view of the flex-wing aileron overlay;

FIG. 7 is a side elevational view of such overlay;

FIG. 8 is a front elevational view of the same;

FIG. 15 is a partial side elevational view of such surface in extended position;

FIG. 16 is a partial front elevational view of the planing surface in the retracted position;

FIG. 17 is a partial side elevational view of such surface in retracted position;

Figure 9:
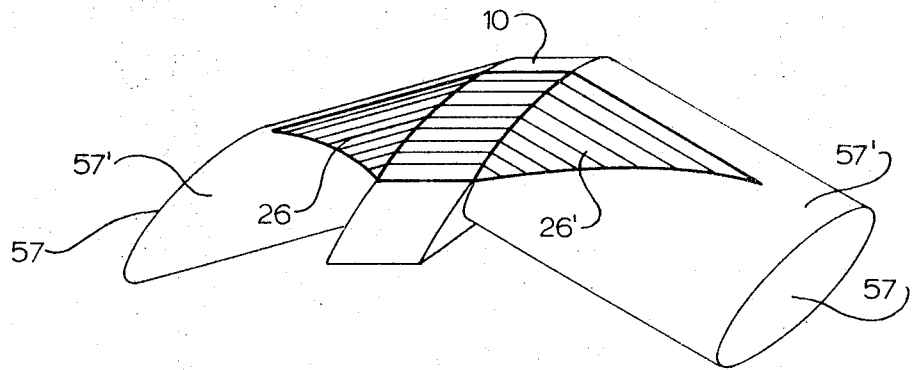
FIG. 9 is a perspective of the basic aircraft of the present invention disclosing the manner in which the shape of the vertical longitudinal cross section of the fuselage is derived.

With further reference to the drawings, a basic airframe is developed by providing a pair of generally vertically disposed airfoil-shaped ribs 11 and 11' of standard and accepted aircraft-type wood or metal construction. These ribs are connected by a multiplicity of crossmembers 12. A pair of rearwardly extending booms 13 and 13' are interconnected to the rear portion of the ribs and are structurally braced against lateral deflection by stays 14. Fixedly secured to and extending between booms 13 and 13' is horizontal stabilizer 15 which is operatively connected, in the normal hinging manner, to elevator 16.

Fixedly second to and upwardly from each of the booms 13 and 13' are vertical stabilizers 17 and 17', respectively, to which are operatively connected, in the normal hinging manner, rudders 18 and 18'.

A pair of leading edge wing spars 19 and 19' are provided which are hingedly connected at their respective roots to the forward, upper portion of ribs 11 and 11', respectively. A pair of struts 20 and 20' are hingedly connected at their lower portion to the lower portion of the rbis and are fixedly secured at their upper portion to their respective wing spars. Because of the spar and strut hinge connection, the wings as hereinafter described are foldable for easy roadablility and storage.

Wing trailing edge cables 21 and 21' are fixedly secured at one end, respectively, to the rear portion of ribs 11 and 11' and at their other end to the tip portion of wing spars 19 and 19'.

Wing tension stays or cables 22 and 22' are fixedly secured at one end, respectively, to the outer portion of wing spars 19 and 19', pass through receivers 23 and 23' and onto a releasable cable-holding means indicated at 24. This holding means may be of any of a number of well-known cable-securing means such as that used for winch locks, anchor ropes and the like.

A flexible wing covering made of heavy fabric, vinyl or the like is secured to and stretched over the triangular area on each side of the aircraft defined by that side's leading edge wing spar, trailing edge cable and the portion of the rib therebetween. To add additionally to the structural strenght and integrity of the flexible fabric portions 25 and 25' of the two wings indicated generally at 26 and 26', a multiplicity of preferably embedded stay or cable means 27 can be extended in a radiating pattern from the juncture of the trailing edge cable and the rear of the cabin 10 to various points along the leading edge spars, particularly as noted in Figs. 1–A and 2–A.

To aerodynamically control the yaw and pitch of the basic version of the present invention, standard rudder and elevator controls (not shown) may be used to conventionally control the elevator and rudder movements. To control the roll of the craft, a pair of overlay ailerons 28 and 28' are provided, one at the tip of each of the wings 26 and 26'.

By so locating these ailerons, they are independent of the stall condition of the wing thereby giving exceptional control characteristics under all operating conditions.

The leading edge of the overlays are hinged for free movement from a portion parallel to the skin of the flexible wing upwardly.

Pivotably mounted for movement about a point 30 on the wing spar is L-shaped deflector arm 29. To the upper end of this arm, as disposed in FIG. 8, is secured on end of control cable 31. To the other end of the deflector arm is pivotably connected one end of deflector linkage 32. The other end of this linkage is pivotably connected to the aileron overlay which may either be a fabric covered frame or a contoured, relatively solid material such as fiber glass.

From the above, ti si obvious that when the control cable 31 is pulled, deflector arm 29 will pivot about point 30 to raise the deflector linkage which in turn raises the trailing edge of the overlay with the front edge pivoting about its hinged connection 33.

By rigging the aileron control stick 56 in the cockpit of the aircraft to control cable 31 in a manner well know to those skilled in the art, when such stick is moved toward one of the wings to induce roll in the aircraft, the deflector on that wing will rise or be deflected upwardly thereby dropppping that wing. The wing is forced downward because the deflected member forms a wedge whose median line is at an angle to the original airfoil chord line. This deflects the airstream as well as increases drag on the down-going wing. This gives favorable yaw to aid in the turning maneuver. Since the aileron overlays normally lie flush against the wing skin, only one will be operated at the time and that will be an upward deflection only to drop that particular wing. In other words, the aileron overlays will not deflect downwardly but will only deflect upwardly, one at the time, to drop, selectively, one wing or the other.

To provide a minimum floatation means for the aircraft as hereinabove described, a pair of lightweight floats 34 and 34' are constructed of a material such as plastic foam with an epoxy of fiber glass type covering. The top of these floats are contoured to match the bottom portion 10' of the cabin 10 so that such floats may be removably mounted thereunder.

The bottom portion of the cabin is also foam filled to give the safety margin of excess floation required. In other words, the float volume need only be enough to displace the aircraft weight with little or no excess floatation since this is found in the lower or bottom portion 10' of the cabin 10.

Figure 10:
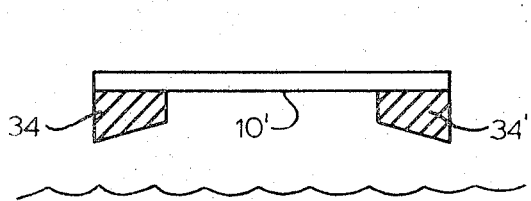
FIG. 10 is a sectional view of the floation means used in conjunction with the present invention.

Concerning the detailed construction of the floats 34 and 34', there is a 90° or greater dead rise on the exterior side 37 of the keel line 38 particularly as noted in FIG. 10. The dead rise on the interior side 39 of the keel line is more or less normal in that it is greater than zero but usually less than 45°. As viewed from the lower or bottom portion 10' of the cabin 10, it may be said that the bottom of the floats have a negative dihedral and that the outsides are generally upright or vertically disposed.

This particular configuration of float cross section has been developed as a result of much experimentation into various possible alternatives and is considered much advanced over the prior art in the initial touchdown stability is greatly increased as well as normal water operation in that there is no tendency to sideslip nor shift the load from one float to the other. Any slipping motion occurring will cease at the time of touchdown and any yawing condition will, by the inherent characteristics of the float immediately be corrected. An additional advantage received from this particular float configuration is that it gives positive stability in light load conditions such as immediately prior to takeoff and immediately after touchdown as well as easily handling the shocks of takeoff and landing and the heavy loaded condition of normal waterwork.

The dead rise angle and the float width can, of course, be varied to suit the designed touchdown speed of the aircraft so that impact forces can be controlled. Thus a range of design choices is available, from wide floats for protected water operation to very narrow floats and a high interior dead rise angle for extremely rough water landings.

A step 40 is provided in each of the floats 34 and 34' for the usual purpose of diminishing resistance, lessening suction effects and to improve longitudinal attitude when operation on water.

Figure 11:
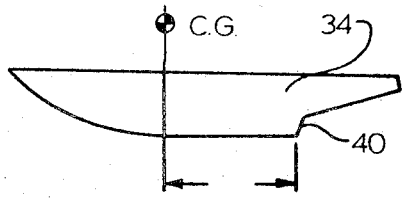
FIG. 11 is a side elevational view of such means.

From FIG. 11 it can be seen that the center of gravity of the floats and the aircraft attached thereto is forward to the step 40 to assure that as the vertical sides of the floats contact the water in a slip condition, the craft will yaw into a stable forward directional movement. In other words, the configuration of the floats in combination with the forward location of the center of gravity assure longitudinal stability while operating on the surface of water.

To mount the floats 34 and 34' to the bottom 10' of the cabin 10, either a releasably fixed means such as bolts 57 can be used or, if a cushioning effect is desired, and particularly if craft is to be fitted with skids or skis beneath the keel lines 38, standard shock absorbing spacers such as rubber bushings or oleo struts can be used. This shock mounting of the floats is considered well within the capabilities of those skilled in the art.

To reduce drag and therefore increase speed and load capacity, fairings may be added to the rear portion of each of the floats from the point adjacent the step 40 reawardly. These fairings are contoured in shape to that of the bottom of the float and are pivoted at the rear portion 43 thereof. A suitable linkage (not shown) connects the forward end of each fairing to a suitable control (not shown) inside the aircraft so that such fairing can be selectively moved from the extended to the retracted postions shown in FIGS. 12 and 13. The obvious advantages of these fairings is that when the step 40 is needed during water operation, such fairings can be raised as shown in FIG. 13 so that the step is available to diminish resistance and the like as hereinabove mentioned. When the craft is airborne, the fairing can be lowered to the position shown in FIG. 12 thereby streamlining the float to eliminate the turbulence and resulting drag caused by an exposed step.

Since it is desirable or quite often necessary for sea or float-type aircraft to achieve a planing condition on the portion of the float means forward of the step as soon as possible, a retractable planing flap or surface 44 can be pivotably mounted to the bottom 10' of the cabin and disposed between the floats 34 and 34', particularly as seen in FIGS. 14 through 17. This planing flap is pivoted about a hinge means 45 and has a linkage (not shown) connecting it to a suitable control (not shown) on the interior of the aircraft. When this planing flap is in the lowered position shown in FIGS. 14 and 15, the whole craft is pushed upward as forward motion is begun thus allowing the craft to rise to the stepped portion of the float at a lower speed. Once step planing is achieved the planing flap 44 can be retracted to the contoured position shown in FIGS. 16 and 17.

Figure 18:
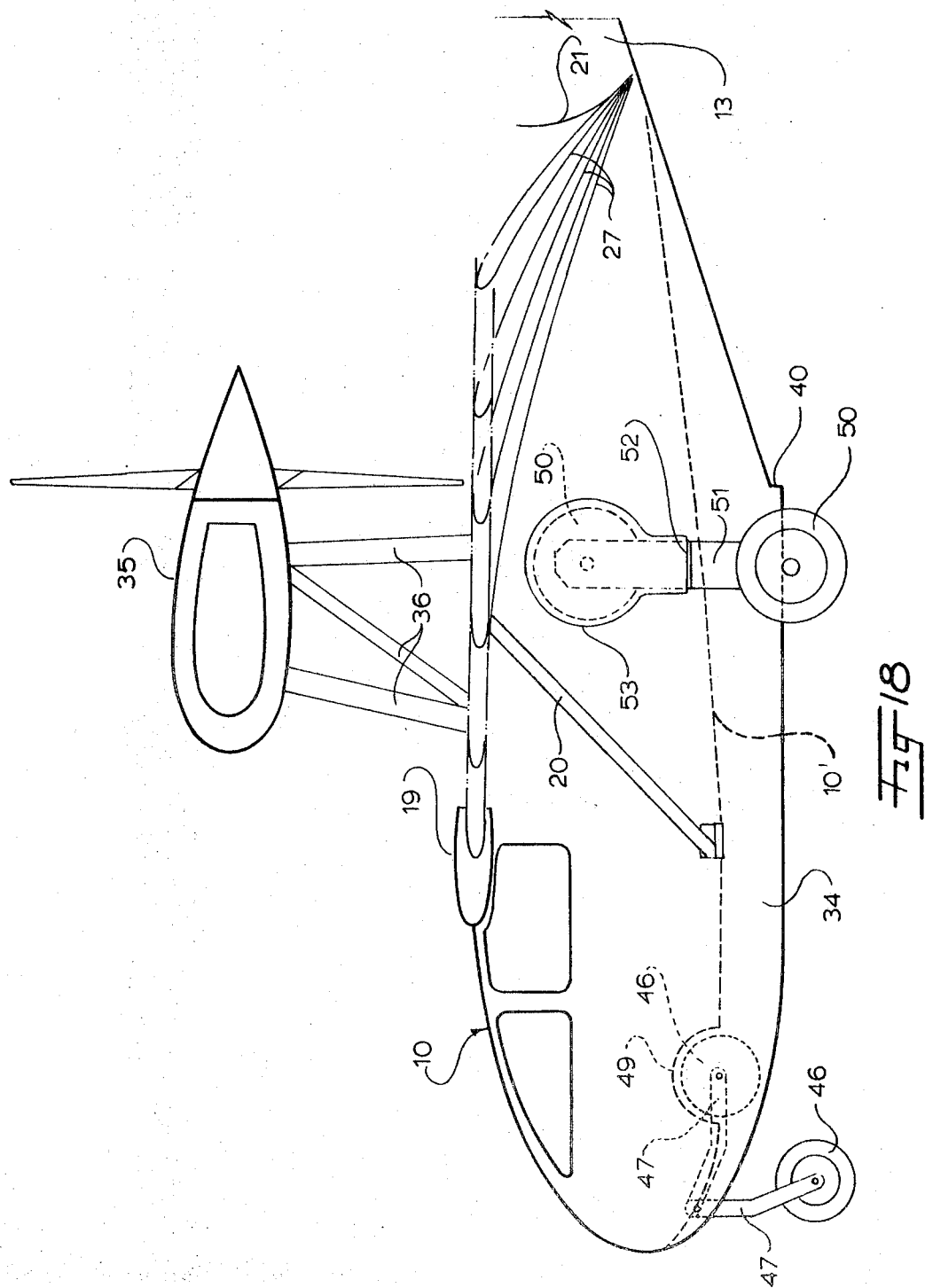
FIG. 18 is a side elevational view of a type of retractable landing gear used with the craft of the present invention.

To make the aircraft of the present invention capable of operating from land, landing gear can be provided as shown in FIG. 18. As will be noted, the nosewheel 46 is rotatively mounted on one end of nosewheel strut 47, the other end of such strut being pivotably mounted about point 48 so that the entire nose gear assembly can be moved from the depending, extended position to the retracted position (with the wheel partially enclosed within the wheel well 49).

A pair of main landing gear are disposed one on each side of the fuselage cabin 10. Each landing gear is composed of a strut 50 which rotatively mounts a main landing gear wheel 51 at one end and is hingedly connected by hinge means 52 at the other end to the side of the fuselage. Thus it can be seen that the main gear wheel can be swung from its down position shown in FIG. 18 outwardly and upwardly into the main gear wheel weel 53 in the retracted position. Either mechanical, hydraulic, electrical or similar means (not shown), considered well within the ability of those skilled in the art, can be used to raise and lower both the main and nosewheels as well as to lock the same in either the retracted or extended positions.

It is obvious that the aircraft of the present invention can be operated as a land-type aircraft with either fixed or retractable landing gear and can readily and quickly be converted into an amphibious type aircraft by adding the hereinabove described floats 34 and 34'. It should be particularly noted that the addition or removal of the floats does not in any way interfere with the landing gear or their operation.

The configuration of the basic unit of the present invention can be summarily described as a cambered keel, flexible winged aircraft. This deviates from the usual design of flexible wing aircraft which utilize a straight center keel. This configuration is convenient for movable wing aircraft where the whole wing is moved about a pivot point for control and for above fuselage mounted wing configurations. One of the main disadvantages of the straight center keel design is that near the root, the airfoil shape approaches a straight line thus greatly reducing the lift efficiency. The present invention provides a much more efficient flexible type wing which can be used in aircraft with conventional controls. The wing is contoured to lie in the surface 57' generated on adjoining portions of two intersecting circular or ellipsoid sectioned cylinders 57. The plane cut by the intersection of these cylinders is used to determine the vertical longitudinal section contour of the basic fuselage design. Thus the wing root sections fit the streamlines of the fuselage thereby giving a solid lift surface in the upper portion of the fuselage and flexible lift surfaces on the adjacent flexible wings, particularly as seen in FIG. 9.

The airfoil shape of the basic fuselage is simple in construction and is well within the skill capabilities of the average aircraft homebuilder. The first step in construction is to build the open-framed craft disclosed in FIGS. 1–A, 1–B, and 1–C having only the upper airfoil portion of the fuselage covered, in combination with the flexible wings shown. This construction can be accomplished in only a matter of months and not the average of 2 to 5 years required for most homebuilt aircraft projects. This simple aircraft can be flown as a glider behind the average water ski boat due to its lightness and slow flight characteristics.

As time and money become available to the builder, the entire cabin area 10 of the fuselage can be enclosed along with a covering of the rearwardly projecting tail booms. A motor 35 can be added above the fuselage so that the plane becomes a self-propelled aircraft.

In summary of the normal progressive steps of the homebuilt type aircraft, a flyable open frame can be at first built and flown as a glider. This glider can later be enclosed and flown in this more sophisticated version with an engine finally being added as the third stage for a complete, enclosed, self-propelled aircraft.

If greater speed is desired, which would be advantageous in cross-country flying, a rigid wing such as that disclosed in FIGS. 3–A, 3–B and 3–C could be attached to the fuselage. The upper portion of this wing would preferably be contoured to the shape of the adjoining section of fuselage.

Although not considered necessary because of the width of the float spacing and the inherence stability of the floats as hereinablove described, if extensive open water work is contemplated where large swells will most likely be encountered, wing tip float configurations such as that disclosed at 54 and 54' could be added to the wingtips.

If the advantages of folding flexible wings are desired in the rigid wings 55 and 55', such wings could be rotatively and pivotably mounted by any of the well-known wing-folding methods (not shown) so that the same could be folded back against the sides of the fuselage and its rearwardly projecting booms.

If even greater speed is desired from the basic configuration of the present invention, an aircraft of the type disclosed in FIGS. 5–A, 5–B and 5–C could readily be provided. It should be noted that the same float configuration is used as could be the retractable landing gear. Since the shape of the upper portion of this modificaion is determined and thereby formed in accordance with the intersecting cylinder airfoil concept, the area from the forward portion of the fuselage to that aft of the wings is generally airfoil shaped to give the improved lift advantages as hereinabove described for the basic configuration.

Figure 19:
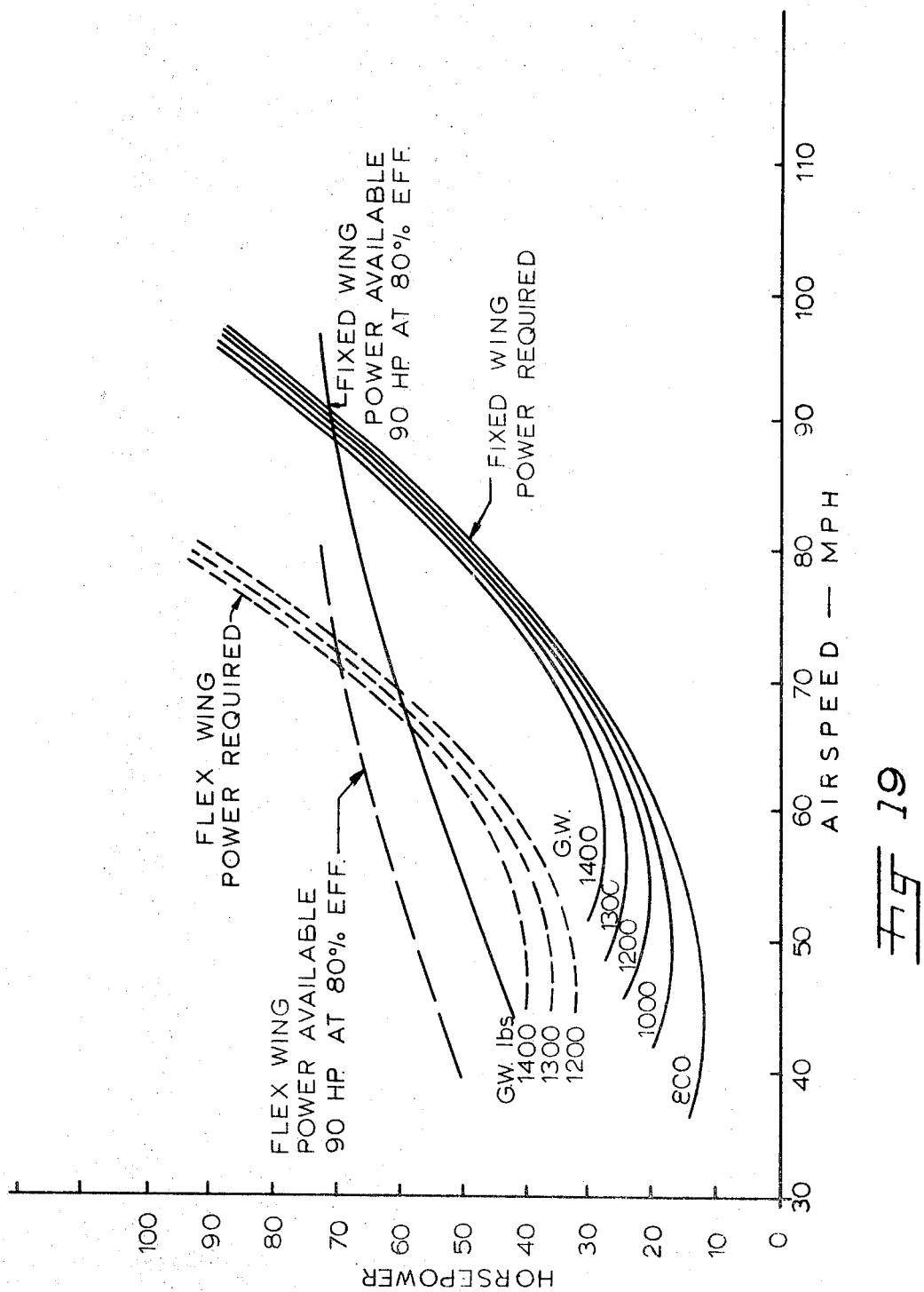
FIG. 19 is a chart showing the comparative horsepower to airspeed requirements of the rigid-wing and flex-wing modifications of the present invention.

Should the superior lift capabilities as exemplified in the comparative chart of FIG. 19 be desired in the streamlined hull configuration of FIGS. 5–A through 5–C, a flexible wing can be mounted ashown in FIGS. 4–A and 4–B. The advantage of this particular modification is obvious in that the streamlined hull will give greater speed than the basic fuselage while the flexible wing will lift more weight at a lower airspeed.

With any of the various configurations and modifications hereinabove described, skis 58 can be added to the keel lines of the floats to convert the aircraft from an amphibian to a triphibian for use on land, sea or snow. When such ski modification is used, if the floats are shock mounted to the fuselage, no further modification would be needed. If the floats are solidly mounted to the fuselage, the skis could be shock mounted by any conventional method such as the use of oleos or the like (not shown).

To actually operate the basic unit disclosed in FIGS. 1–A through 1–C or 2–A through 2–C, the wings can be unfolded from a position adjacent the booms 13 and 13' by pulling the cables 22 and 22' through the receivers 23 and 23' until the trailing edge cables 21 and 21' are taunt. The cable-holding means 24 can then be activated to secure the cables 22 and 22' thus holding the leading edge spars 19 and 19' in the flight position.

If operating on land, the landing gear are extended, or if operating on water, the landing gear are retracted. Also if operating on water, the fairings would be retracted and the planing flap lowered prior to the takeoff run. As the craft moves forward, it rises on the portion of the float forward of the step 40. The planing flap 44 is then retracted for streamlining since it is no longer needed. As the craft leaves the surface of the water and becomes airborne, the float fairings 42 are lowered into the position shown in FIG. 12 to further aerodynamically streamline the aircraft and reduce drag.

Figure 12:
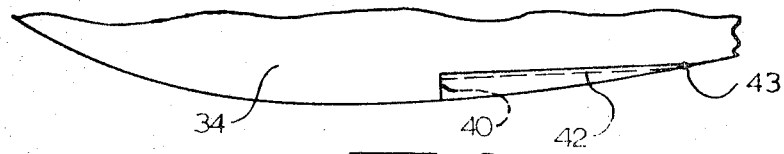
FIG. 12 is a partial view of the lower portion of the float means showing the step fairing in extended, contoured position.
Figure 13:
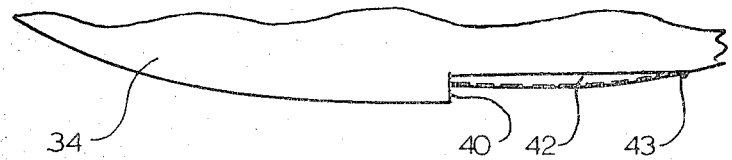

When the plane is being brought in for a water landing, the fairings 42 are either retracted as shown in FIG. 13 or left extended as shown in FIG. 12 since they do not greatly effect the water operation of the aircraft except when attempting to plane on the portion floats forward of the step.

If either landing or takeoff is to be accomplished from land, the landing gear will be extended as shown in FIG. 18 and the craft will be handled by conventional controls as any tricycle geared aircraft. Once airborne, the gear can be retracted as hereinabove described to further aerodynamically streamline the craft for greater speed.

Since the yaw, roll and pitch of the basic aircraft and all modifications thereof are controlled through conventional stick and rudder pedal controls, no detailed description of these operations is deemed necessary since they fall well within the skill of any licensed fixed wing aircraft pilot.

Whether the rigid wing or flex wing will be selected for a particular type of operation will largely depend on weighing the comparative factors shown on the weight-horsepower-airspeed chart included as FIG. 19. In addition to the obvious comparative differences in the rigid and flex wing operations, the flex wing has the advantage of being lower in initial cost, easier and simpler to fold as well as having a greater load capacity at lower air speeds. The rigid or conventional wing version has the natural advantage of longer life with operation at greater speeds and is more acceptable to the average pilot of today.

From the above, it is obvious that the present invention has the advantage of allowing individuals to construct in stages and fly an aircraft with superior lift capacities for a reasonable monetary outlay. This aircraft can be readily converted from a land plane, to an amphibian, to a sea plane without one version causing modification in the function or operation of the other. The present invention has the further advantage of being readily modifiable from a flexible wing aircraft to a rigid wing aircraft and vice versa without necessitating complicated hull or control modifications.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. An aircraft comprising: a ridged hull having an airfoil shaped vertical longitudinal cross section generally equal to the curvature and shape of the plane of intersection of two angularly disposed cylinders; wing-type lift surfaces operatively attached to said hull and formed from reinforced flexible material attached along a substantial portion of the upper surface of the airfoil-shaped hull and disposed laterally therefrom to lie in a portion of the surfaces generated by the two intersecting cylinders, said flexible wings being foldable from extended flight position to a folded position adjacent the side of said hull; and vertical and horizontal stabilizing means operatively connected to said hull whereby a high aspect ratio aircraft is provided having both flexible and rigid airfoil surfaces.

2. The aircraft of claim 1 wherein the intersecting cylinders are generally circular in lateral cross section.

3. The aircraft of claim 1 wherein the intersecting cylinders are generally elliptical in lateral cross section.

4. The aircraft of claim 1 including roll-controlling ailerons pivotably mounted along their leading edges adjacent the tips of the wings and normally lying juxtaposed to said wings; and means for selectively raising one aileron at the time whereby roll may be controlled by raising the aileron in the desired direction of control.

5. The aircraft of claim 1 including a pair of float means secured to said hull; each of said floats having a dead rise of at least 90° from keel line to exterior side and a dead rise of generally less than 45° from keel line to interior side whereby an extremely stable floatation means is provided.

6. The aircraft of claim 5 wherein skis are attached along at least a portion of the keel line of each of the floats whereby said aircraft may be landed, selectively, on water or snow.

7. The aircraft of claim 5 wherein the floats are removably mounted.

8. The aircraft of claim 1 wherein a pair of floats are secured to said hull; at least one retractable water planing flap is operatively mounted to the lower portion of said hull between said floats whereby a planing condition of said floats may more rapidly be obtained.

9. The method of constructing a nonfactory built aircraft comprising the steps of forming an airfoil shaped hull frame having a vertical longitudinal cross section generally equal in curvature and shape to the plane of intersection of two angularly disposed cylinders with a pair of laterally disposed flexible type wings connected thereto along a substantial distance of its upper surface and lying in a portion of the surfaces generated by said cylinders whereby a first stage glider-type aircraft is provided; covering said hull frame with an aircraft-type skin whereby an enclosed glider-type aircraft is provided; and operatively mounting an engine to said enclosed hull whereby a third stage self-propelled aircraft is provided.

10. The method of claim 9 including substituting rigid-type wings for said flexible-type wings whereby a fourth stage high-speed aircraft is provided.